United States Patent
Hachmann et al.

(10) Patent No.: US 9,435,591 B2
(45) Date of Patent: Sep. 6, 2016

(54) HEAT EXCHANGER PIVOTABLE FOR CLEAN-OUT

(75) Inventors: Robert J. Hachmann, Peosta, IA (US); Daniel R. Klein, Asbury, IA (US)

(73) Assignee: DEERE & COMPANY, Moline, IL (US)

(*) Notice: Subject to any disclaimer, the term of this patent is extended or adjusted under 35 U.S.C. 154(b) by 912 days.

(21) Appl. No.: 13/608,431

(22) Filed: Sep. 10, 2012

(65) Prior Publication Data

US 2014/0069608 A1 Mar. 13, 2014

(51) Int. Cl.
| | | |
|---|---|---|
| B60H 1/00 | (2006.01) |
| F28G 15/02 | (2006.01) |
| B60K 11/04 | (2006.01) |
| F28F 9/00 | (2006.01) |
| F01P 11/12 | (2006.01) |
| F28G 13/00 | (2006.01) |

(52) U.S. Cl.
CPC ............. *F28G 15/02* (2013.01); *B60K 11/04* (2013.01); *F01P 11/12* (2013.01); *F28F 9/002* (2013.01); *B60Y 2200/415* (2013.01); *F01P 2070/52* (2013.01); *F28F 2280/10* (2013.01); *F28G 13/00* (2013.01)

(58) Field of Classification Search
CPC ....... B60K 11/04; B60K 11/02; B60K 11/06; F28G 1/00; F01P 3/18; F01P 2070/52; F28F 9/0258; F28F 2265/32; F28F 2280/02; F28F 2280/10; F28F 2280/105
USPC ........ 165/41, 67, 69, 72, 73, 75–79, 95, 151
See application file for complete search history.

(56) References Cited

U.S. PATENT DOCUMENTS

| | | | | |
|---|---|---|---|---|
| 3,757,853 | A | * | 9/1973 | Daman ........................... 165/76 |
| 3,834,478 | A | * | 9/1974 | Alexander et al. .......... 180/68.6 |
| 3,978,938 | A | * | 9/1976 | Joscher et al. ............... 180/68.4 |
| 4,066,119 | A | * | 1/1978 | Stedman ......................... 165/41 |
| 4,081,050 | A | * | 3/1978 | Hennessey et al. .......... 180/233 |
| 4,542,785 | A | * | 9/1985 | Bagnall et al. ................. 165/95 |
| 4,696,361 | A | * | 9/1987 | Clark et al. ................. 180/68.4 |
| 6,092,616 | A | * | 7/2000 | Burris et al. ................. 180/68.1 |
| 6,105,660 | A | * | 8/2000 | Knurr ............................. 165/41 |
| 6,237,676 | B1 | * | 5/2001 | Hasegawa et al. ............. 165/67 |
| 6,880,656 | B2 | | 4/2005 | Pfusterschmid et al. |
| 6,966,355 | B2 | * | 11/2005 | Branham et al. ............... 165/41 |
| 7,089,994 | B2 | * | 8/2006 | Esposito et al. ................ 165/42 |
| 7,255,189 | B2 | * | 8/2007 | Kurtz et al. ................. 180/68.4 |
| 2005/0173095 | A1 | * | 8/2005 | Fujita et al. ................... 165/77 |
| 2006/0005943 | A1 | * | 1/2006 | Rasset et al. ................... 165/77 |
| 2008/0135209 | A1 | * | 6/2008 | Lowe et al. .................... 165/77 |
| 2010/0230073 | A1 | * | 9/2010 | Kotani et al. ................... 165/67 |

OTHER PUBLICATIONS

Background Information (1 page)(prior art before Sep. 12, 2012).

* cited by examiner

*Primary Examiner* — Travis Ruby
(74) *Attorney, Agent, or Firm* — Taft Stettinius & Hollister LLP; Stephen F. Rost

(57) ABSTRACT

A machine has a mount, a support mounted pivotally to the mount to pivot relative to the mount about a first pivot axis between a first support position and a second support position, and a heat exchanger. The heat exchanger is mounted pivotally to the support to pivot relative to the support about a second pivot axis between a first exchanger position and a second exchanger position.

19 Claims, 14 Drawing Sheets

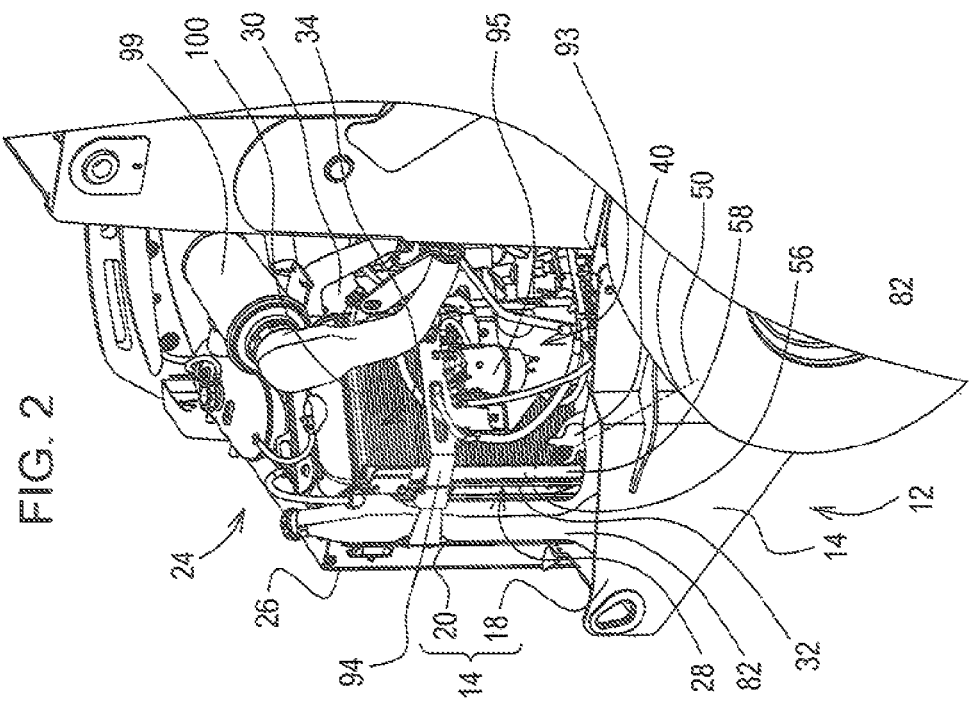
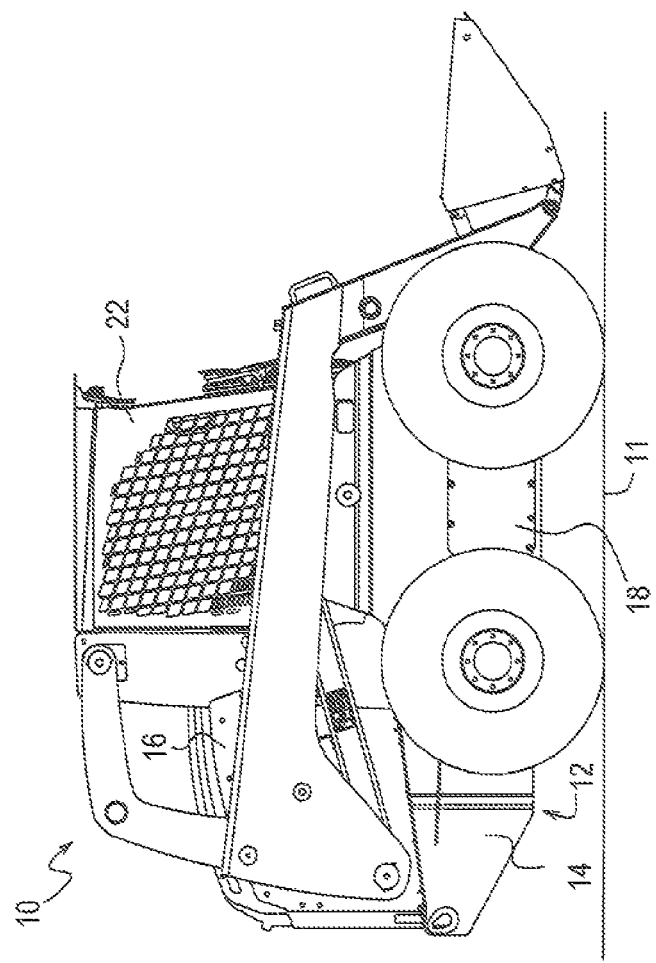

HEAT EXCHANGER PIVOTABLE FOR CLEAN-OUT

FIELD OF THE DISCLOSURE

The present disclosure relates to a pivotable heat exchanger.

BACKGROUND OF THE DISCLOSURE

Heat exchangers are used on machines for a variety of purposes. For example, there are heat exchangers for cooling engine coolant, hydraulic oil, charge air, and air conditioner working fluids. From time to time, heat exchangers are cleaned to promote their efficiency.

SUMMARY OF THE DISCLOSURE

According to an aspect of the present disclosure, a machine comprises a mount, a support mounted pivotally to the mount to pivot relative to the mount about a first pivot axis between a first support position and a second support position, and a heat exchanger.

The heat exchanger has at right angles to one another a first dimension, a second dimension, and a third dimension. In a use position of the heat exchanger, the heat exchanger has a height in the first dimension, a width in the second dimension, and a thickness in the third dimension. The heat exchanger is porous therethrough in the third dimension for flow of air through the heat exchanger.

The heat exchanger is mounted pivotally to the support to pivot relative to the support about a second pivot axis between a first exchanger position and a second exchanger position. The second pivot axis is parallel to the second dimension. The first pivot axis is non-parallel to the second dimension and is positioned higher than the second pivot axis at a point of connection between the support and the mount when the support is positioned in the second support position. The heat exchanger is movable relative to the mount between the use position in which the heat exchanger is positioned in the first exchanger position and the support is positioned in the first support position and a clean-out position in which the heat exchanger is positioned in the second exchanger position and the support is positioned in the second support position. The heat exchanger is configured to lean about the second pivot axis away from the first exchanger position toward the second exchanger position allowing tilting of the heat exchanger about the first pivot axis during a transition between the use position and the clean-out position.

The above and other features will become apparent from the following description and the attached drawings.

BRIEF DESCRIPTION OF THE DRAWINGS

The detailed description of the drawing refers to the accompanying figures in which:

FIG. 1 is a side elevation view representation of a machine in the form of, for example, a skid steer machine;

FIG. 2 is a perspective view representation showing, in a use position, a heat exchanger of a cooling package of the machine;

DETAILED DESCRIPTION OF THE DRAWINGS

Figure 3:
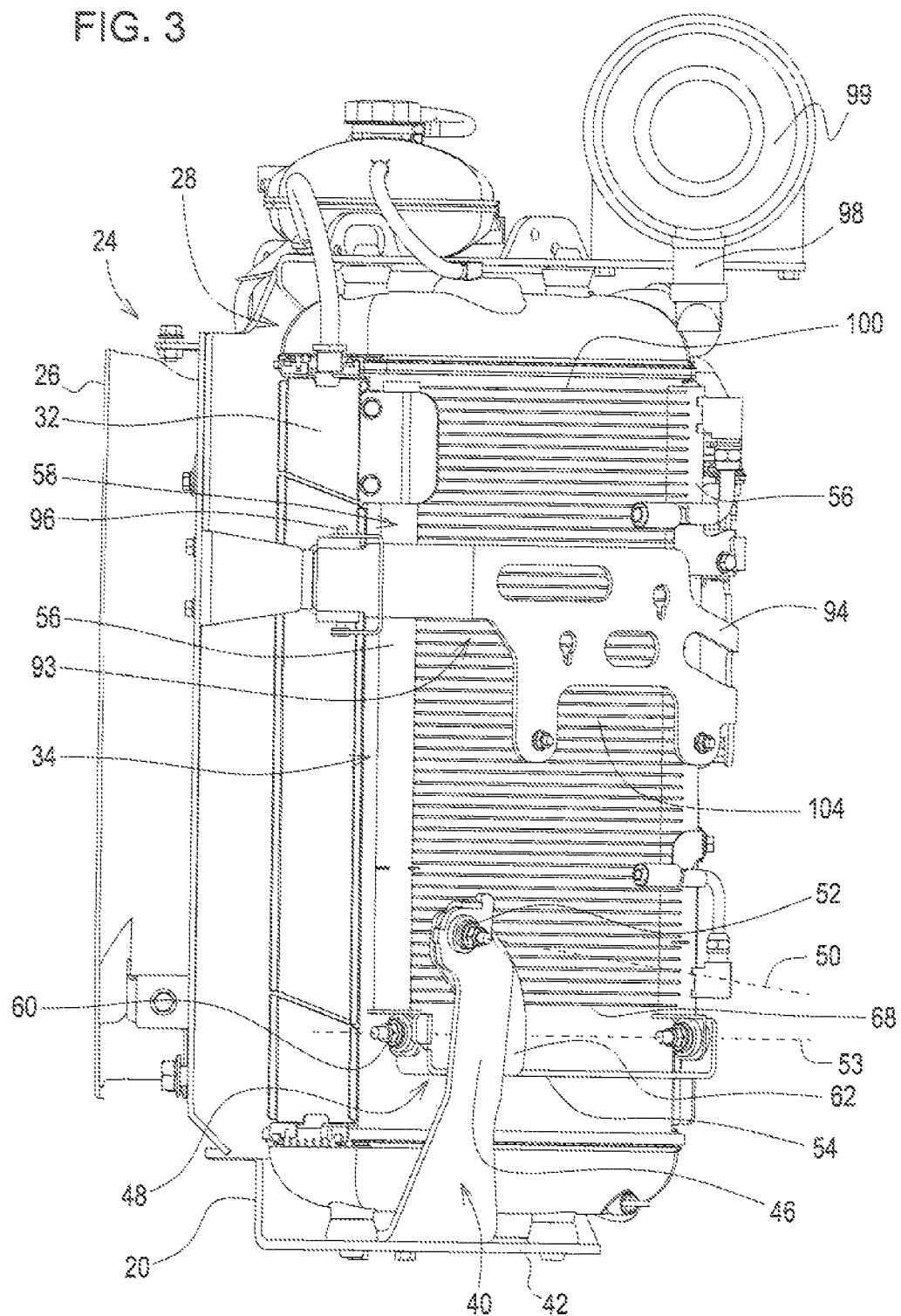
FIG. 3 is a side elevation view representation of the cooling package showing a stand that rises from a floor of a cooling frame of the cooling package and a support that is mounted pivotally to the stand to pivot relative to the stand about a first pivot axis and showing the heat exchanger mounted pivotally to the support to pivot relative to the support about a second pivot axis.
Figure 4:
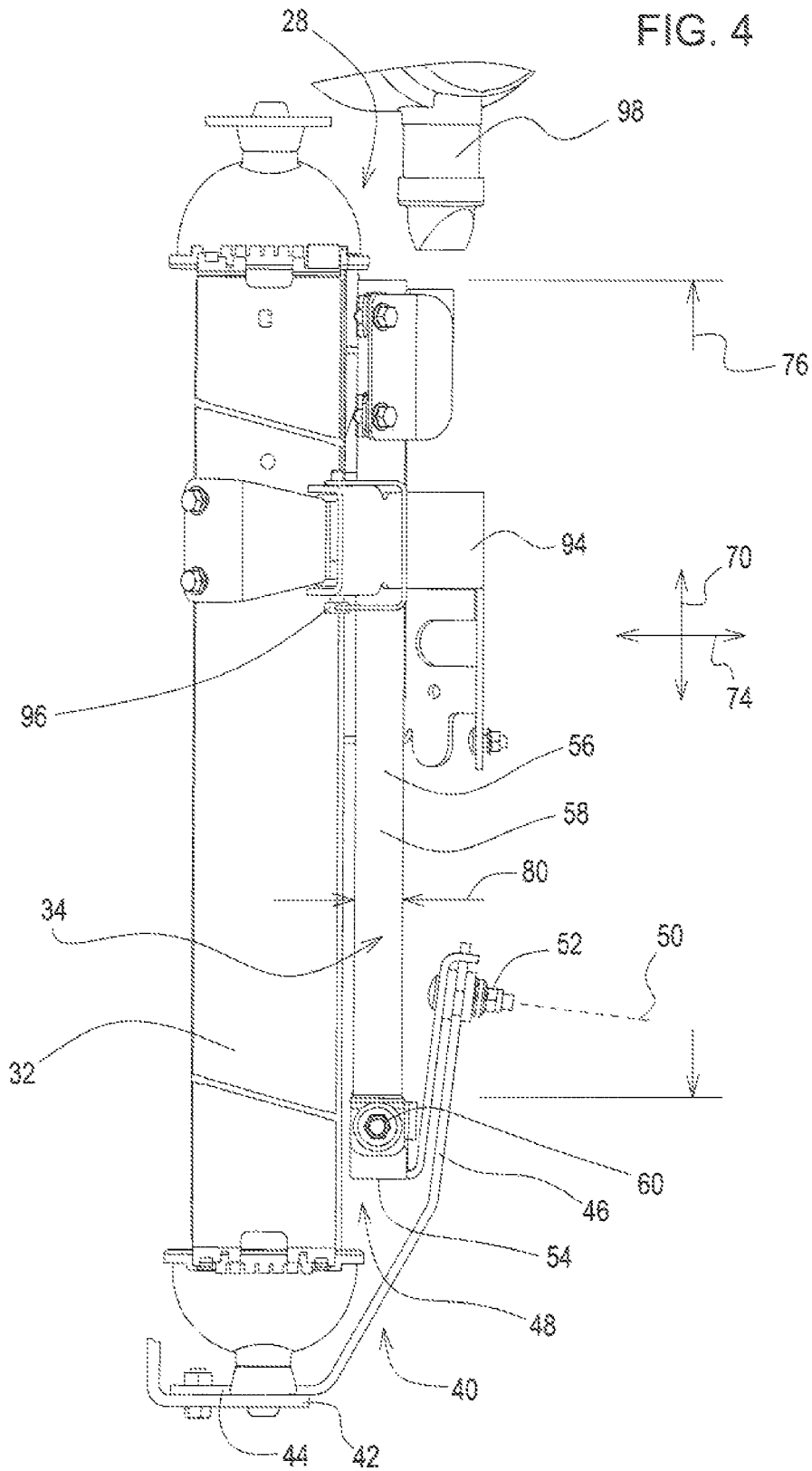
FIG. 4 is a side elevation view representation of the heat exchanger in the use position.

Referring to FIG. 1, there is shown an exemplary machine 10. Exemplarily, the machine 10 is shown as a work vehicle in the form of a skid steer machine, but it is understood that the machine 10 may take the form of any of a wide variety of work vehicles or other machines.

The machine 10 is considered to be positioned on an imaginary datum plane 11 which is fixed with reference to the machine 10. For purposes herein, the datum plane 11 is considered to define a horizontal plane such that vertical is at right angles to the datum plane 11. When the machine 10 is placed on level ground, the datum plane 11 coincides with true horizontal. However, if the machine 10 is placed on unlevel ground, even though the datum plane 11 no longer coincides with true horizontal, it nonetheless is considered to define what is horizontal and, correspondingly, what is vertical. As used herein, terms such as, for example, horizontal, vertical, lean, tilt, top, bottom, their variants, and any other terms connoting a relationship to horizontal or vertical are taken to be relative to the datum plane 11.

The machine 10 has a mount 12. Exemplarily, the mount 12 includes a framework 14 and a housing 16. The framework 14 includes a main or vehicle frame 18 and a cooling frame 20 mounted to the main frame 18. Mounted to the frame 18 are, for example, an operator's station 22 of the machine 10 and an engine (not shown) of the machine 10.

The housing 16 is mounted to the main frame 18. Toward the rear of the machine 10, the housing 16 includes a side panel on each of the left- and right-hand sides of the machine 10 and a rear cover hinged to the machine 10. Each side panel may be detached and removed from the machine 10 and the cover may be pivoted upwardly, thereby exposing, for example, a cooling package 24 of the machine 10.

Referring to FIGS. 2 and 3, the cooling package 24 includes the cooling frame 20, a cooling fan 26, and a number of heat exchangers mounted to the cooling frame 20. The cooling fan 26 is mounted to the cooling frame 20 along a first or rear side of the cooling package 24. A first set 28 of heat exchangers is mounted to the cooling frame 20 and is positioned along a second side of the cooling package 24. A second set 30 of heat exchangers is mounted to the cooling frame 20 and is positioned along a third side of the cooling package 24. The first, second, and third sides of the cooling package 24 cooperate to provide the cooling package 24 with a generally triangular shape and define a cooling plenum.

Figure 14:
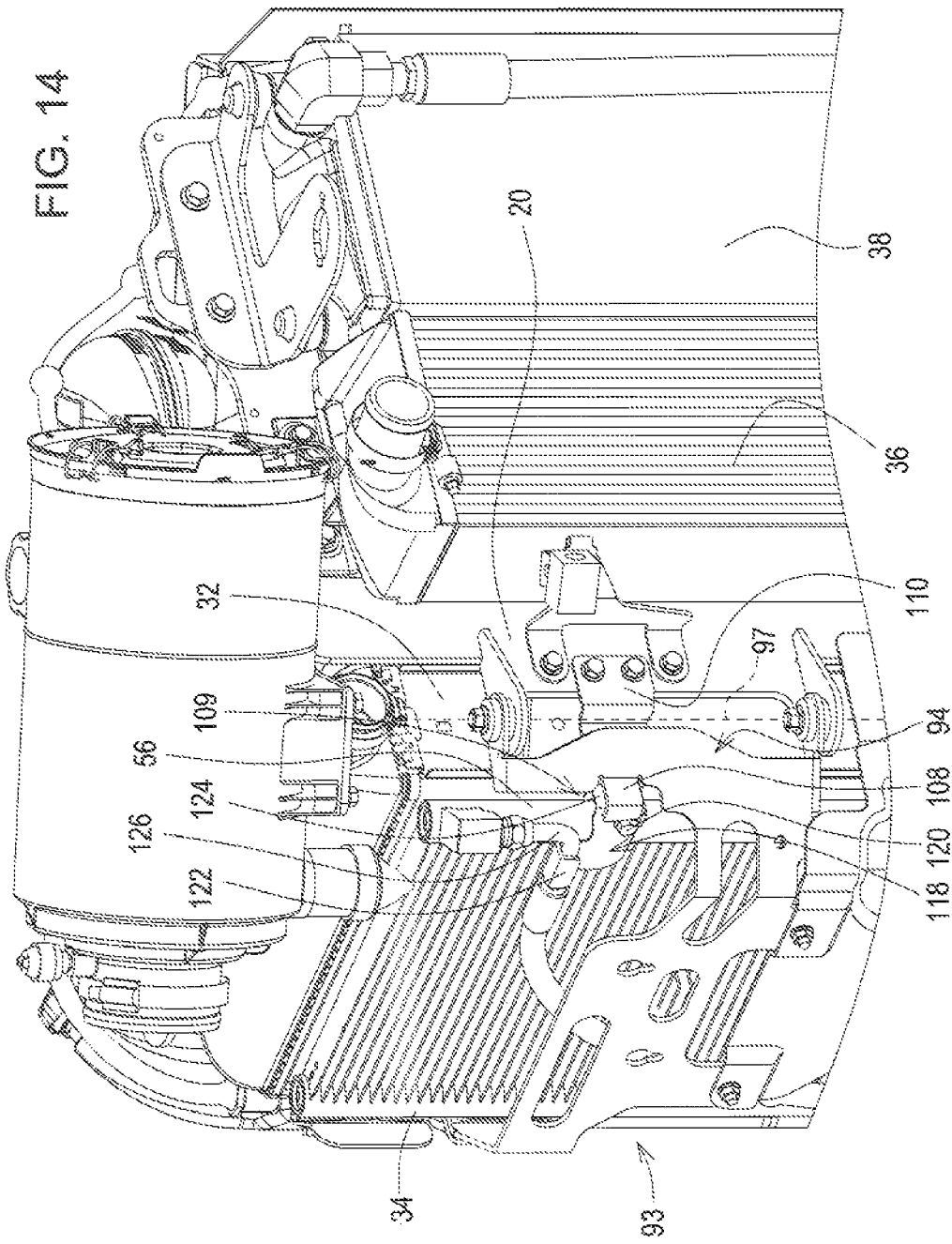
FIG. 14 is an elevation view representation looking rearwardly along an axis of the machine showing locking of the heat exchanger in the use position.

The heat exchangers are mounted to the cooling frame 20, and are, for example, block-shaped. The first set 28 of heat exchangers includes a first heat exchanger 32 and a second heat exchanger 34. During use, the first and second heat exchangers 32, 34 are stacked in flow-series, face-to-face relation to one another such that the first heat exchanger 32 is positioned between the second heat exchanger 34 and the cooling plenum. The second set 30 of heat exchangers includes a third heat exchanger 36 and a fourth heat exchanger 38, the third and fourth heat exchangers 36, 38 mounted side-by-side relative to one another (FIG. 14). Exemplarily, the first heat exchanger 32 is a radiator for engine coolant, the second heat exchanger 34 is a condenser of an air-conditioning system of the machine 10, the third heat exchanger is a charge air cooler, and the fourth heat exchanger is a hydraulic oil cooler (the third heat exchanger positioned between the second and fourth heat exchangers).

With respect to the first set 28 of heat exchangers, the first heat exchanger 32 is mounted (e.g., bolted) to the cooling frame 20 against movement relative thereto. The second heat exchanger 34 is mounted for movement relative to the cooling frame 20, and thus relative to the first heat exchanger 32 and the mount 12, between a stowage, use position (FIGS. 2-8) for use of the heat exchanger 34 and a deployed, clean-out position (FIGS. 10-13) for clean-out of the heat exchanger 34, as discussed in more detail herein.

Referring to FIGS. 2-8, the cooling frame 20 includes a stand 40. The stand 40 is mounted to a floor 42 of the cooling frame 20 and rises therefrom. The stand 40 has a lower portion 44 and an upper portion 46. The lower portion 44 is detachably fastened (e.g., bolted) to the floor 42 so as to be mounted to the mount 12. Exemplarily, the stand 40 is configured as a bent plate (e.g., a metal plate) with two bends, in which case the upper portion 46 may be considered as the portion of the stand 40 above the upper bend, and the lower portion 44 may be considered as the portion of the stand 40 below the upper bend.

The machine 10 includes a support 48 mounted pivotally to the mount 12 to pivot relative to the mount 12 about a first pivot axis 50 between a first support position and a second support position. The support 48 is mounted pivotally to the upper portion 46 of the stand 40 by use of a pivot connection 52.

The heat exchanger 34 is mounted pivotally to the support 48 to pivot relative to the support 48 about a second pivot axis 53 between a first exchanger position and a second exchanger position. The second pivot axis 53 is horizontal when the support 38 is positioned in the first support position.

The support 48 includes a U-shaped bracket 54 and an arm 62 to which the bracket 54 is mounted against movement relative thereto. The support 48 is configured, for example, as a one-piece structure with the arm 62 bent relative to the bracket 54. Two sides 56 of the periphery 58 of the heat exchanger 32 opposite to one another are mounted pivotally to the bracket 54 by use of two pivot connections 60. Each of the two sides 56 is configured, for example, as a header of the heat exchanger 32. The arm 62 is mounted pivotally to the upper portion 46 of the stand 40 by use of the pivot connection 52.

The bracket 52 includes a first ear 64, a second ear 64, and a bar 66 interconnecting the first and second ears 64. The first side 56 of the heat exchanger 34 is mounted pivotally to the first ear 64, and the second side 56 of the heat exchanger 34 is mounted pivotally to the second ear 64. The bar 66 is mounted to the arm 62 and extends along and under the heat exchanger 34 when the heat exchanger 34 is positioned in the use position. The bar 66 extends along a portion 68 of the heat exchanger 34 configured as the bottom portion of the heat exchanger 34 when the heat exchanger 34 is positioned in the use position.

The upper portion 46 of the stand 40 includes a first travel limiter 86 and a second travel limiter 88. The support 48 includes a striker 90 mounted to and angled from the arm 62 so as to extend between the first and second travel limiters 86, 88. The first travel limiter 86 is configured to contact the striker 90 to limit pivoting of the support 48 about the first pivot axis 50 beyond the first support position. As such, if the support 48 over-pivots about the pivot axis 50, the striker 90 will come into contact with the first travel limiter 86. The striker 90 will thus normally not be in contact with the first travel limiter 86 when the support 48 is positioned in the first support position.

The striker 90 is configured to contact the second travel limiter 88 when the support 48 is positioned in the second support position. When the support 48 is positioned in the second support position, the striker 90 contacts the second travel limiter 88. Exemplarily, the travel limiters 86, 88 are configured as outwardly projecting tabs, and the striker 90 is configured as a tab bent relative to the arm 62.

Figure 12:
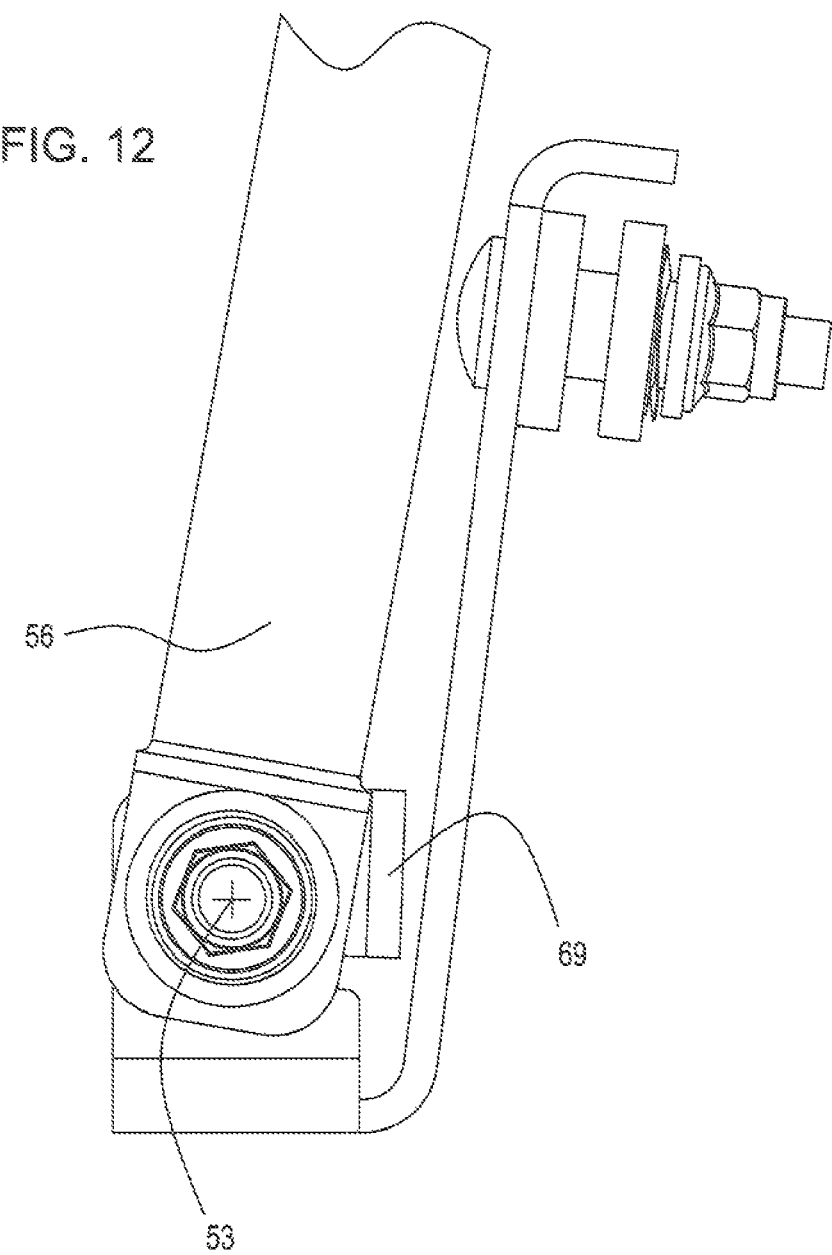
FIG. 12 is an elevation view representation of the heat exchanger in the clean-out position, with portions broken away.
Figure 13:
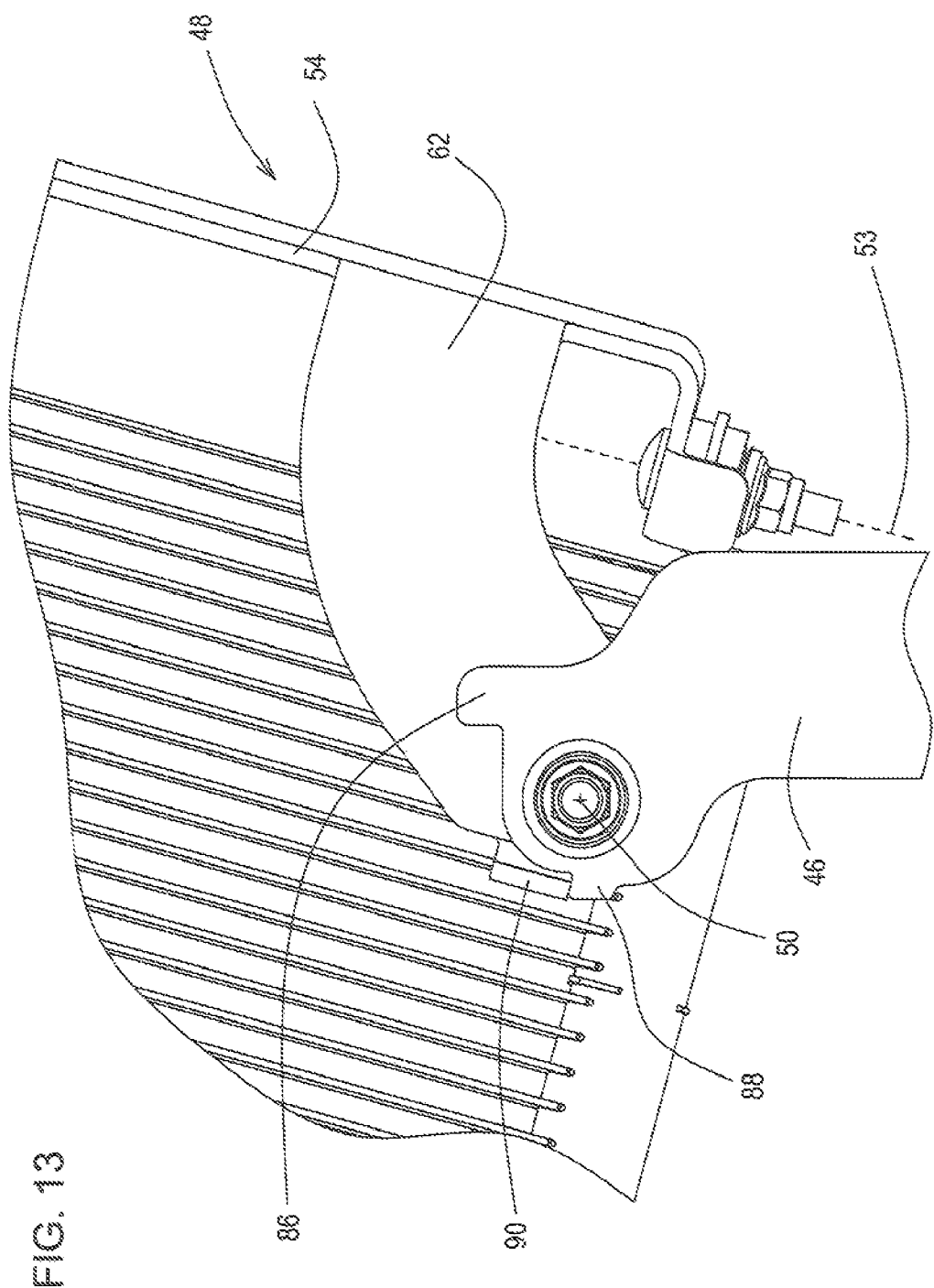
FIG. 13 is a front elevation view representation of the heat exchanger in the clean-out position, with portions broken away, showing the striker of the support contacting a second travel limiter of the stand.

The bracket 52 includes a travel limiter 69 mounted to and angled from the first ear 64, as shown, for example, in FIG. 12. The heat exchanger 34 is configured to contact the travel limiter 69 when the heat exchanger 34 is positioned in the second exchanger position, preventing the fins of a fin unit 101 of the heat exchanger 34 from raking against the stand 40 upon pivoting the heat exchanger about the axis 50. When the heat exchanger 34 is positioned in the second exchanger position, the first side 56 (i.e., the laterally outer side 56) contacts the travel limiter 69. In the case where the first side 56 is a header, a bottom portion of the header contacts the travel limiter 69. Exemplarily, the travel limiter 69 is configured as a tab bent relative to the first ear 64.

The heat exchanger 34 is configured, for example, as a block-shaped heat exchanger. The heat exchanger 34 has at right angles to one another a first dimension 70, a second dimension 72, and a third dimension 74. In the use position, the heat exchanger 34 has a height 76 (FIG. 4) in the first dimension 70, a width 78 (FIGS. 7 and 8) in the second dimension 72, and a thickness 80 (FIGS. 4-6) in the third dimension 74 such that the thickness 80 is less than the height 76 and less than the width 78.

The fin unit 101 of the heat exchanger 34 is porous therethrough in the third dimension 74 for flow of air through the heat exchanger 34. The fin unit 101 includes straight fins 102 and undulating fins 103 (e.g., undulation pitch of 12 per inch), as shown, for example, in FIG. 8. Except the top straight fin 102 and the bottom straight fin 102, the straight fins 102 are tubular in order to conduct fluid between the headers 56. Each undulating fin 103 is positioned between adjacent straight fins 102 and extend between the headers 56, as shown, for example, with respect to the bottom undulating fin 103 in FIG. 8, the other undulating fins 103 being represented thereby but not shown for ease and clarity of illustration. The top and bottom straight fins 102 act as end caps between the tubular straight fins 102, such that the top straight fin 102 and the next adjacent straight fin 102 cooperate to capture the top undulating fin 103 therebetween and the bottom straight fin 102 and the next adjacent straight fin 102 cooperate to capture the top undulating fin 103 therebetween. The two headers 56 and the fin unit 101 cooperate to provide a core of the heat exchanger 34.

Air flows through the heat exchanger 34 past the fins 102, 103 thereof generally in the third dimension 74 in response to pressure from the fan 26 during use of the cooling package 24. The second pivot axis 53 is parallel to the second dimension 72. The first pivot axis is non-parallel to the second dimension 72.

The heat exchanger 34 is movable relative to the mount 12 between the use and the clean-out positions. In the use position, shown, for example, in FIGS. 2-8, the heat exchanger 34 is positioned in the first exchanger position and the support 48 is positioned in the first support position such that the heat exchanger 34 is positioned in proximity to a first obstacle and a second obstacle without tilting over the second obstacle. In the clean-out position, shown, for example, in FIGS. 10-13, the heat exchanger 34 is positioned in the second exchanger position and the support 48 is positioned in the second support position such that the heat exchanger 34 is angled about the second pivot axis 53 relative to the first obstacle and is tilted about the first pivot axis 50 over the second obstacle.

Figure 9:
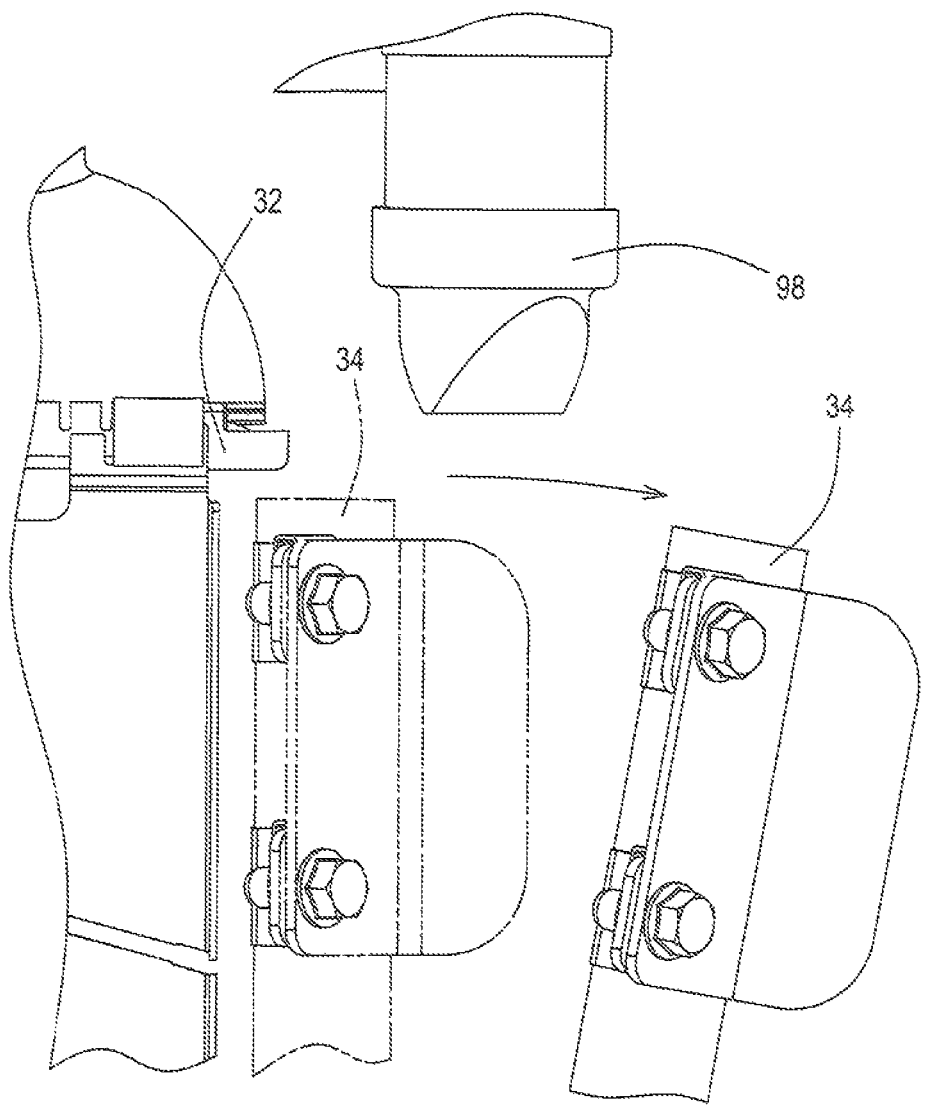
FIG. 9 is a side elevation view representation of the heat exchanger, with portions broken away, showing the heat exchanger pivoted relative to the support about the second pivot axis from a first exchanger position, shown in phantom, to a transition exchanger position, shown in solid.
Figure 10:
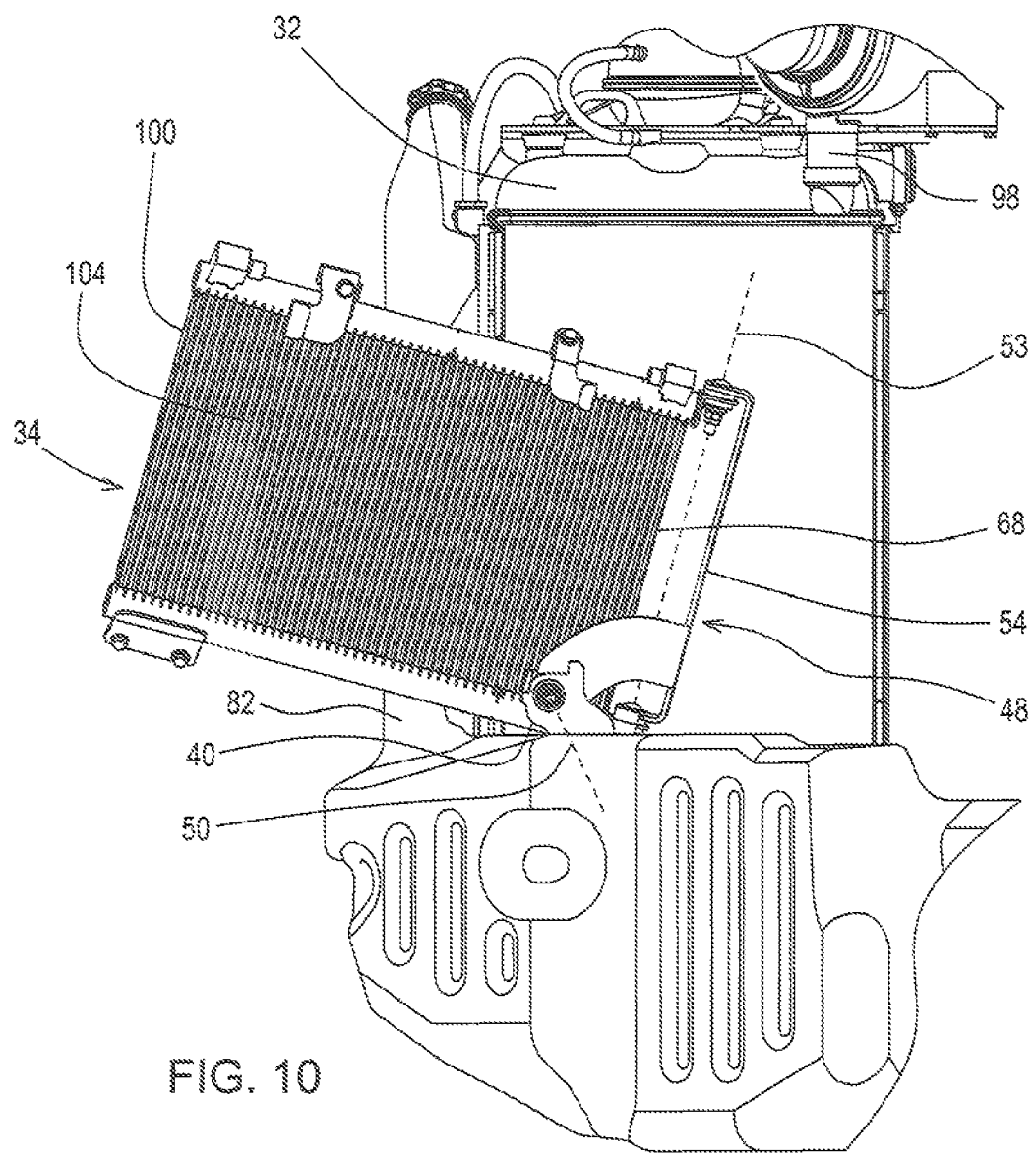
FIG. 10 is a perspective view representation showing the heat exchanger in a clean-out position.
Figure 11:
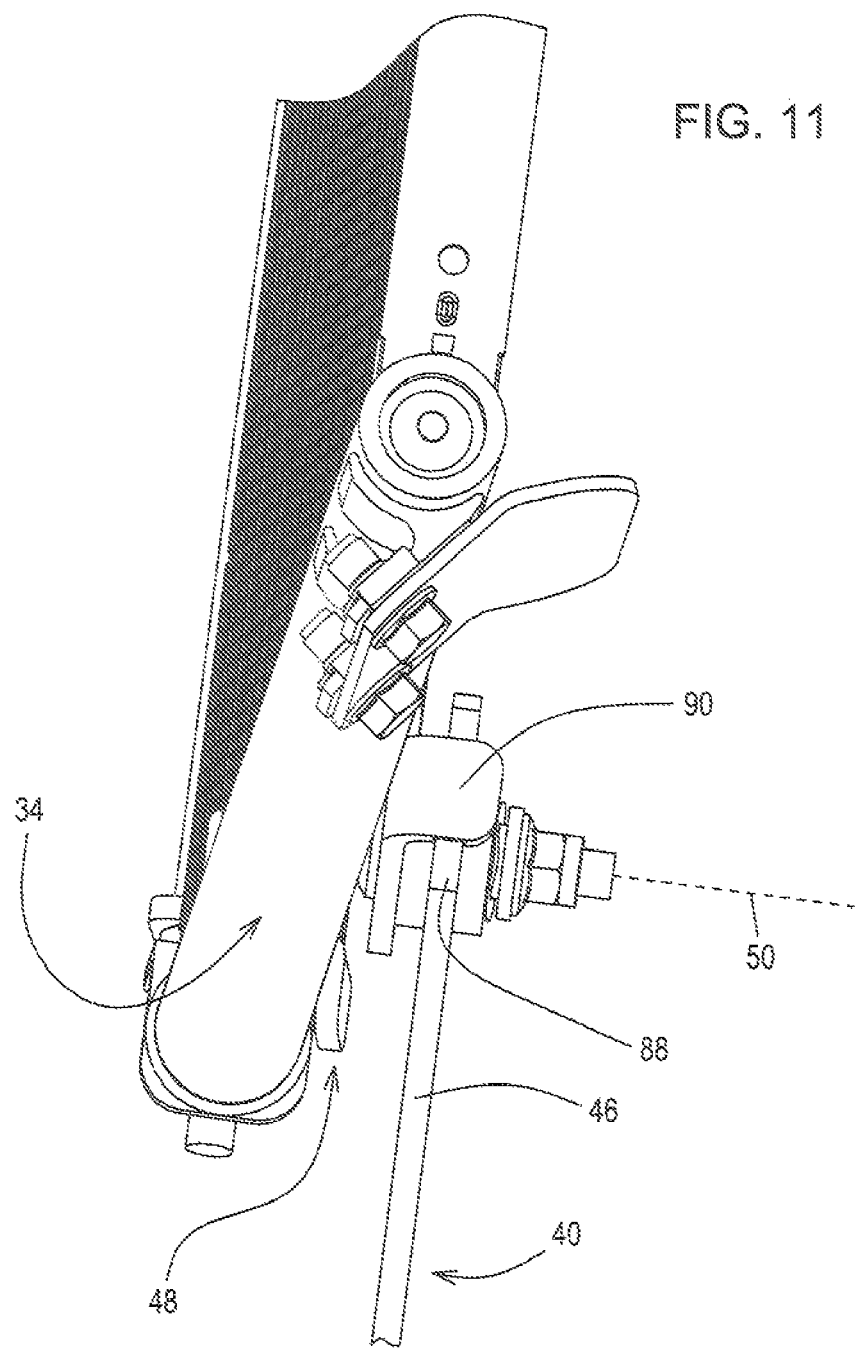
FIG. 11 is a side elevation view representation of the heat exchanger in the clean-out position, with portions broken away.

The heat exchanger 34 is configured to lean about the second pivot axis 53 away from the first exchanger position toward the second exchanger position allowing tilting of the heat exchanger 34 about the first pivot axis 50 during a transition between the use position and the clean-out position, as shown, for example, in FIG. 9. As such, the heat exchanger 34 is configured to lean about the second pivot axis 53 away from the first obstacle providing a clearance between the heat exchanger 34 and the first obstacle allowing tilting of the heat exchanger 34 about the first pivot axis 50 during a transition between the use position and the clean-out position.

Exemplarily, the first obstacle is the first heat exchanger 32, and the second obstacle is a fuel tank 82. It is understood that the first and second obstacles may be any type of obstacles that may hinder movement of the heat exchanger 34 between the use and clean-out positions. As such, the obstacles may be included in the mount 12 or be distinct therefrom. In the example where the first obstacle is the heat exchanger 32 and the second obstacle is the fuel tank 82, the obstacles are distinct from the mount 12.

The first pivot axis 50 is positioned higher than the second pivot axis 53 at the point of connection between the support 48 and the stand 40 of the mount 12 (i.e., the pivot connection 52) when the support 48 is positioned in the first support position, facilitating tilting of the heat exchanger 34 over the second obstacle. As such, the support 48 depends relative to the stand 40 when the support 48 is positioned in the first support position. The arm 62 of the support 48 depends relative to the upper portion 46 of the stand 40 when the support 48 is positioned in the first support position.

The first pivot axis 50 is inclined, facilitating pivotal movement of the heat exchanger 34 relative to the second pivot axis 53. The term "inclined" means to deviate from vertical and horizontal. The arm 62 and the upper portion 46 are inclined to provide for the inclination of the first pivot axis 50. The arm 62 and the upper portion 46 are, for example, parallel to one another.

Figure 5:
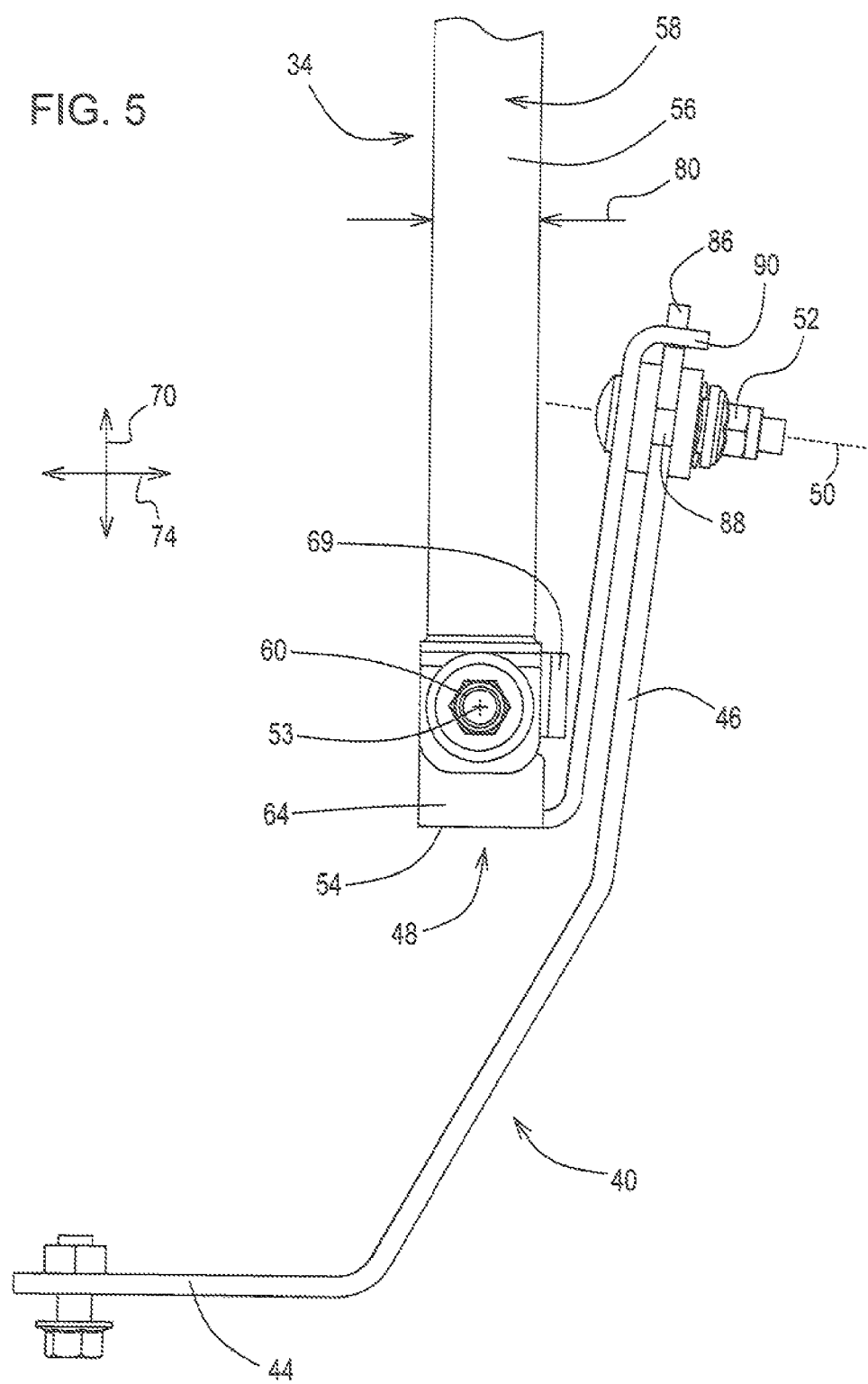
FIG. 5 is an enlarged side elevation view representation of the heat exchanger in the use position, with portions broken away.
Figure 6:
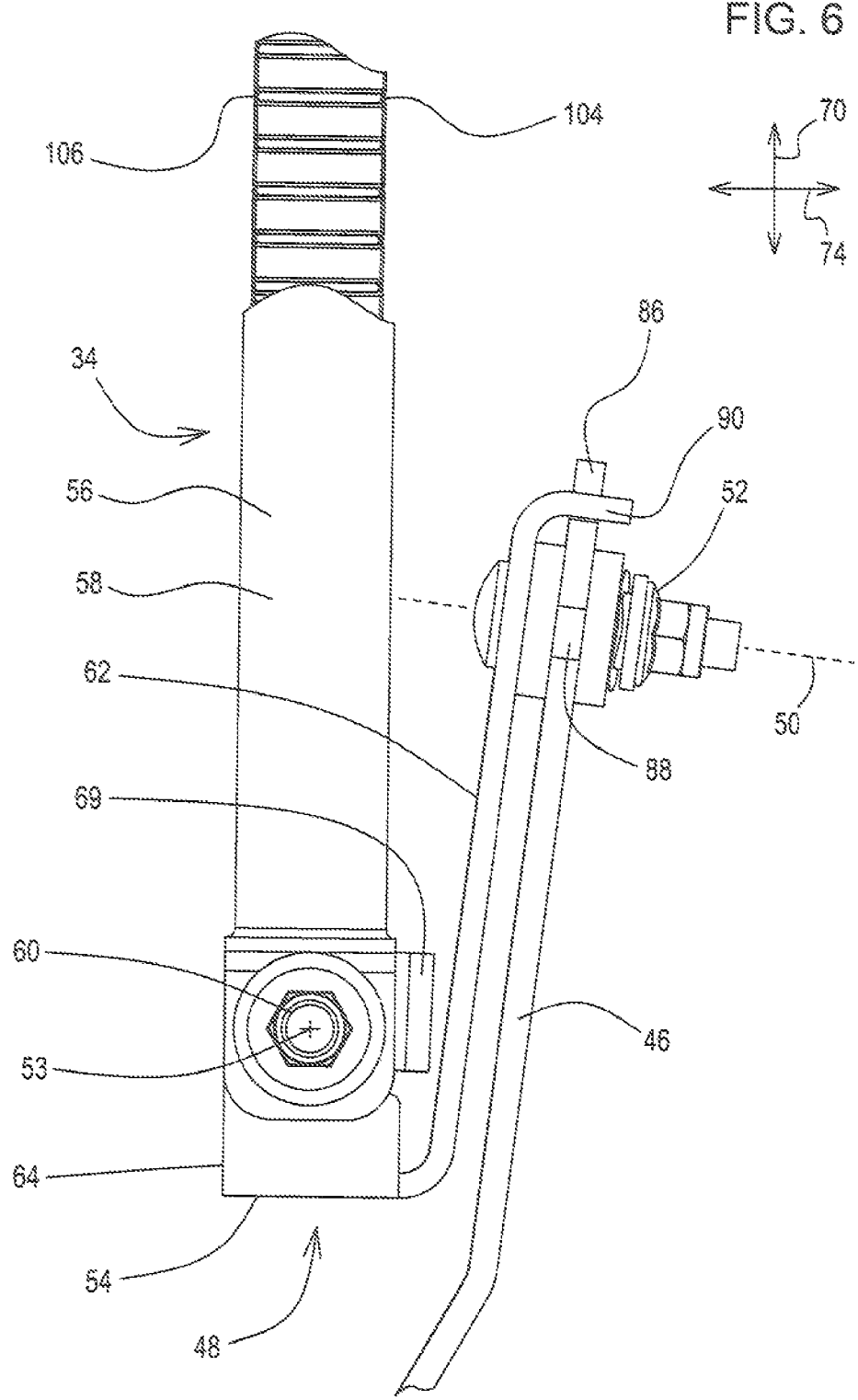
FIG. 6 is a further enlarged side elevation view representation of the heat exchanger in the use position, with portions broken away, showing a pivot connection between the support and the stand.

Referring to FIGS. 5 and 6, the pivot connection 52 mounts pivotally the support 48 to the stand 40. The pivot connection 52 includes a bolt and a nut, the bolt having a shank and a square body positioned next to the head between the head and the shank and positioned matingly within a square hole of the arm 62 so as to block relative rotation between the bolt and the arm 62. The nut is threaded onto the shank. The shank extends through a tubular spacer (made, for example, of steel) that has opposite ends abutting respectively the arm 62 and the nut and that extends through a hole of the upper portion 46 of the stand 40. A first rubber washer through which the spacer extends is positioned between the arm 62 and the upper portion 46 on a first side of the upper portion 46. A second rubber washer through which the spacer extends is positioned on a second side of the upper portion 46 opposite to the first side such that the upper portion 46 is sandwiched between the first and second rubber washers. A steel washer, a lock washer, and a shim are positioned on the spacer (such that the spacer extends through the steel washer, the lock washer, and the shim) in that order with the steel washer closest to the nut and the shim closest to the second rubber washer.

Figure 7:
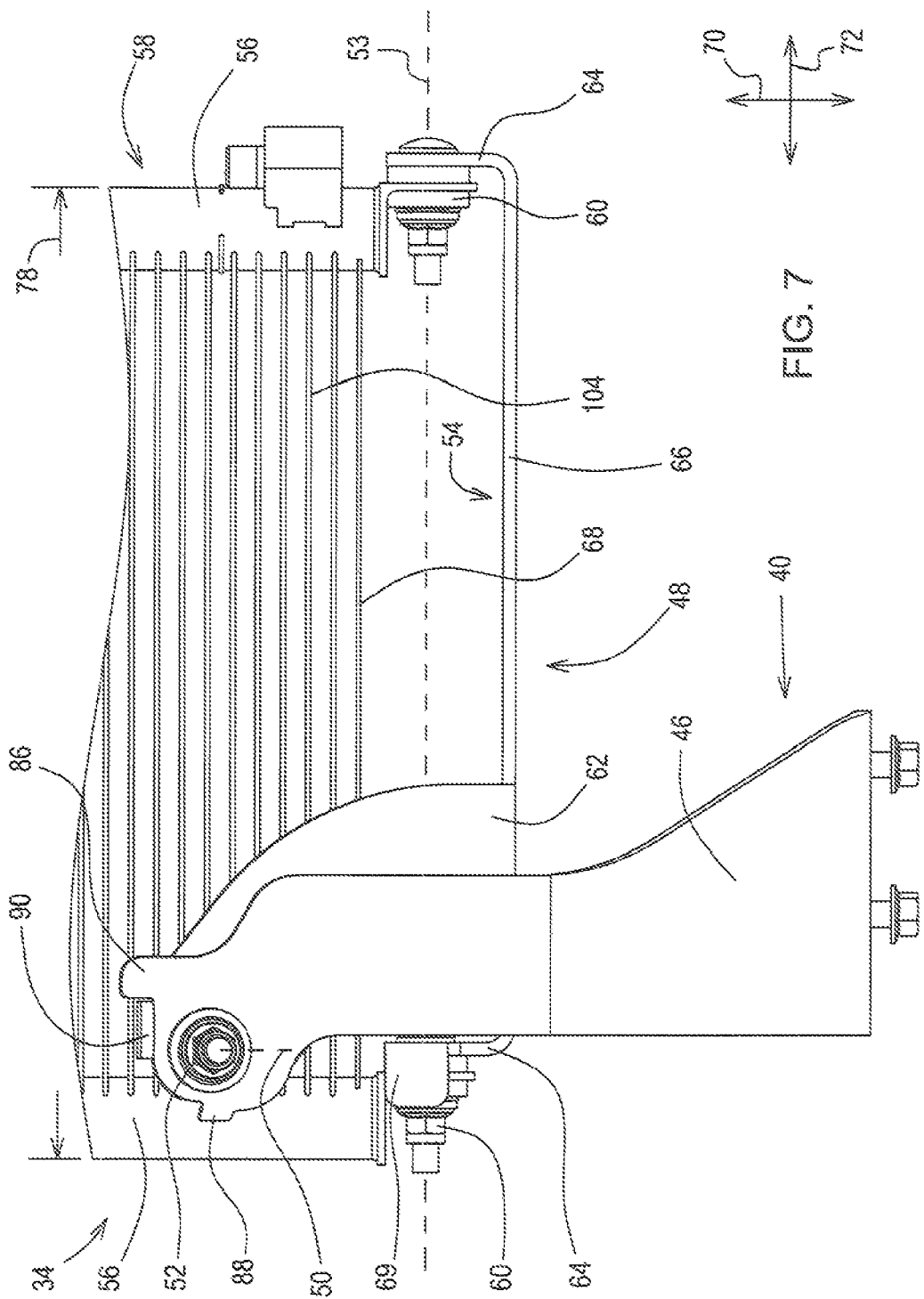
FIG. 7 is a front elevation view representation of the heat exchanger in the use position, with portions broken away, showing a striker of the support contacting a first travel limiter of the stand.
Figure 8:
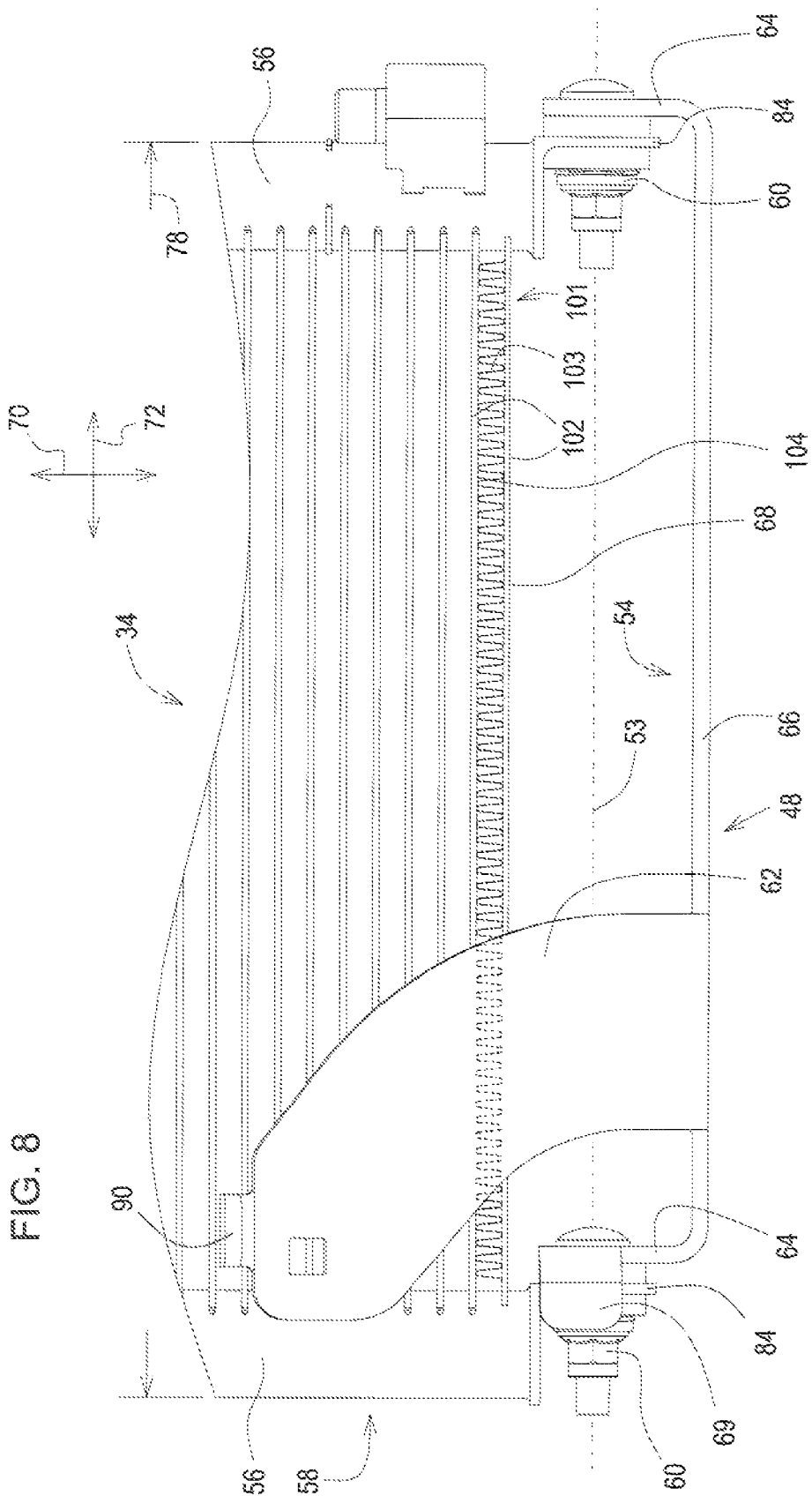
FIG. 8 is a front elevation view representation of the heat exchanger in the use position, with portions broken away, showing the support.

Referring to FIGS. 7 and 8, the pivot connections 60 mount pivotally respectively two ears 84 of the heat exchanger 34 to the support 48. Each pivot connection 60 is configured in a manner similar to the pivot connection 52. The pivot connection 60 includes a bolt and a nut, the bolt having a shank and a square body positioned next to the head between the head and the shank and positioned matingly within a square hole of a respective ear 64 of the bracket 54 so as to block relative rotation between the bolt and that bracket ear 64. The nut is threaded onto the shank. The shank extends through a tubular spacer (made, for example, of steel) that has opposite ends abutting respectively the respective bracket ear 64 and the nut and that extends through a hole of the respective exchanger ear 84. A first rubber washer through which the spacer extends is positioned between the respective bracket ear 64 and the respective exchanger ear 84 on a first side of the respective exchanger ear 84. A second rubber washer through which the spacer extends is positioned on a second side of the respective exchanger ear 84 opposite to the first side such that the respective exchanger ear 84 is sandwiched between the first and second rubber washers. A steel washer, a lock washer, and a shim are positioned on the spacer (such that the spacer extends through the steel washer, the lock washer, and the shim) in that order with the steel washer closest to the nut and the shim closest to the second rubber washer.

The heat exchanger has a periphery 58. The periphery 58 includes the peripheral portion 68. The peripheral portion 68 is an edge of the exchanger 34, the edge being the bottom edge of the exchanger 34 when the exchanger 34 is positioned in the use position. The second pivot axis 53 is positioned in proximity to the peripheral portion 68 and is parallel thereto.

Referring to FIG. 6, the heat exchanger 34 includes a first or front face 104 and an opposite second or rear face 106. The faces 104, 106 are defined by the fins 102, 103 of the heat exchanger 34 and are parallel to one another. Air flows across both faces 104, 106 as it flows through the heat exchanger 34 (e.g., to the left in FIG. 6 during normal cooling operation). The second pivot axis 53 is parallel to each face 104, 106.

Referring to FIGS. 2-8, the heat exchanger 34 is movable relative to the mount 12 between the use position and the clean-out position. In the use position, the heat exchanger 34 is positioned for providing its heat exchanging capability when the fan 26 advances air through the core of the heat exchanger 34. The heat exchanger 34 is positioned in the first heat exchanger position and the support 48 is positioned in the first support position. In the use position, the heat exchanger 34 may be upright and close to the heat exchanger 32 (e.g., 10 millimeters apart) such that the heat exchangers 32, 34 are positioned in confronting relation to one another. Because the heat exchangers 32, 34 are close to one another and their cores are parallel to one another, they are considered to be in face-to-face relation to one another.

A restraint 93 is provided to secure the heat exchanger 34 in the use position. The restraint 93 includes a mounting plate 94 hinged at one end to the cooling frame 20 and a pin 96 that extends through an opposite end of the mounting plate 94 and a collar attached to the heat exchanger 34 to hold the mounting plate 94 in place. A fuel filter 95 (FIG. 2) is mounted to the mounting plate 94. A heat shield made, for example, of a rubberized plastic is mounted to the mounting plate 94 so as to depend therefrom to protect the heat exchanger 34 from engine heat.

In order to clean out the heat exchanger 34, the pin 96 is removed so as to release the mounting plate 94 and thus the heat exchanger 34. The mounting plate 94 is then pivoted away from the heat exchanger 34.

Referring to FIG. 9, once released, the heat exchanger 34 is pivoted away from the first exchanger position about the second pivot axis 53 toward the second exchanger position to a transition exchanger position, thereby clearing an overhanging portion of the first heat exchanger 32, preventing raking of the fins of the heat exchangers 32, 34 upon tilting of the heat exchanger 34, and facilitating access to the heat exchanger 34 for clean-out. The heat exchanger 34 may be leaned all the way to the second exchanger position, or to any suitable transition exchanger position between the first and second exchanger positions. Pivoting of the exchanger 34 from the first exchanger position about the second pivot axis 53 toward the second exchanger position causes a peripheral portion 100 of the periphery 58 of the exchanger 34 to move away from the exchanger 32 and away from the first exchanger position, the peripheral portion 100 providing a top edge of the periphery 58 of the exchanger 34 when the exchanger 34 is positioned in the use position. The orientation of that edge in the first exchanger position is parallel to the orientation of that edge in the second exchanger position.

The machine 10 may have a third obstacle in the form of, for example, a flexible spout 98 (e.g., a "duckbill") of an air pre-cleaner 99 of the machine 10. The pre-cleaner 99 is mounted to the cooling frame 20. If the exchanger 34 is tilted about the first pivot axis 50 while the exchanger 34 is in the second exchanger position, the exchanger 34 will bump the spout 98. Since the spout is flexible, the spout 98 will yield and allow the exchanger 34 to be tilted, but may cause the spout 98 to open and discharge dust collected therein and may eventually cause premature wear of the spout 98. As such, it may be desirable to lean the exchanger 34 about the second pivot axis 53 to a transition exchanger position between the first and second exchanger positions so as to clear both the first heat exchanger 32 and the spout 98 for tilting about the first pivot axis 50, as shown, for example, in FIG. 9. In other packaging configurations, the spout 98 may be positioned elsewhere to avoid this issue altogether.

Referring to FIGS. 10-13, from the transition exchanger position or the second exchanger position, the heat exchanger 34 is tilted about the first pivot axis 50 from the first support position to the second support position. If not already, the exchanger 34 may be pivoted further about the second pivot axis 53 to the second exchanger position such as, for example, after the spout 98 is cleared. The exchanger 34 assumes the clean-out position when the exchanger 34 is positioned in the second heat exchanger position and the support 48 is positioned in the second support position. The exchanger 34 may be cleaned in the clean-out position. It will be appreciated that the exchanger 34 may be cleaned in positions intermediate of the use position and the clean-out position. The exchanger 34 may be moved back to the use position and re-secured for further use of the exchanger 34.

Figure 15:
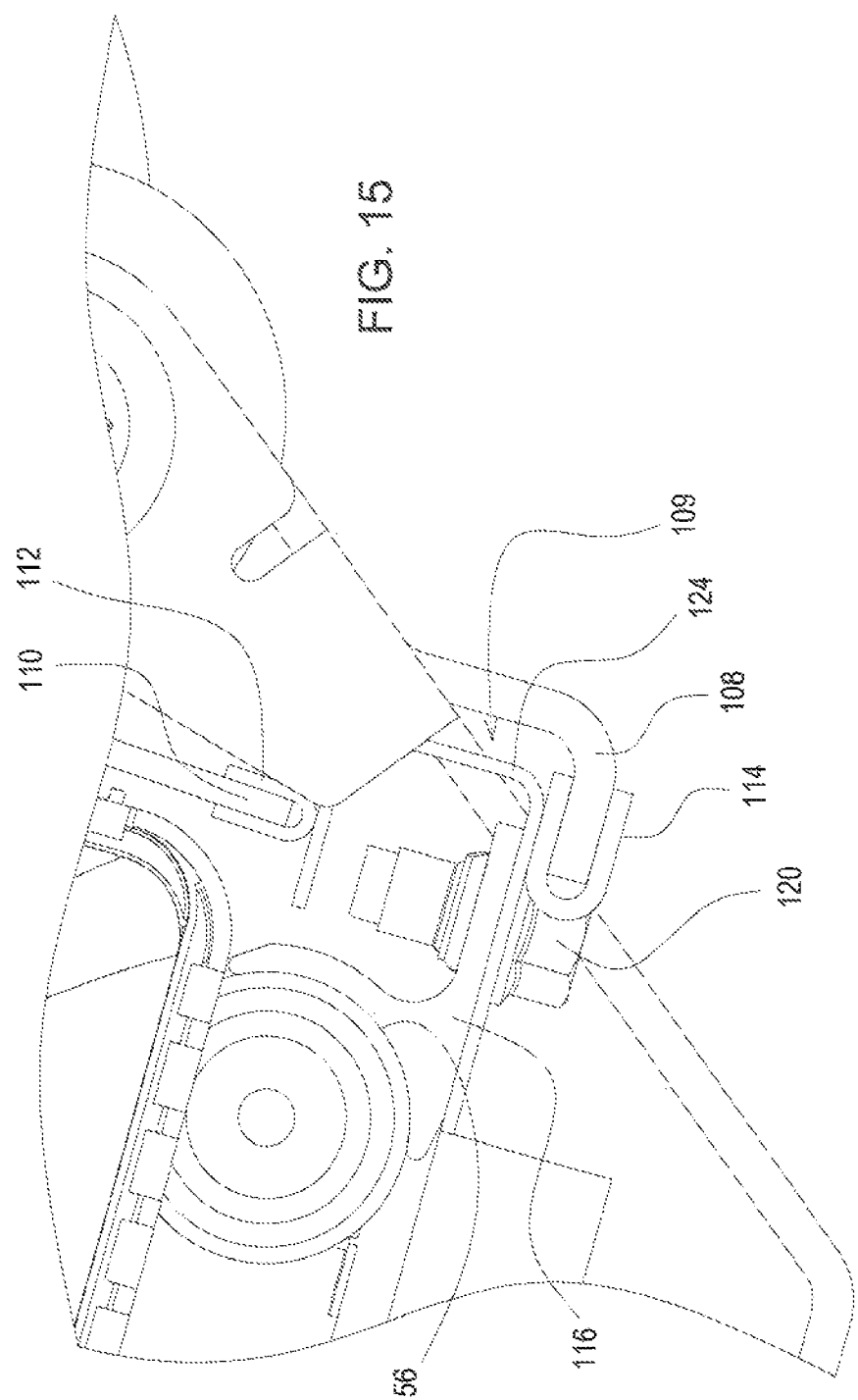
FIG. 15 is a top plan view representation of a detail showing locking of the heat exchanger in the use position.

Referring to FIGS. 14 and 15, the mounting plate 94 is mounted pivotally to the cooling frame 20 for pivotal movement about a pivot axis 97. When the mounting plate 94 is secured to the second heat exchanger 34 with the pin 96, the mounting plate 94 and a nose 110 of the cooling frame 20 secure the second heat exchanger 34 in the use position in spaced-apart relation to the first heat exchanger 32 to protect the fins 102, 103 of the heat exchanger 34 (e.g., the fin unit 101 of the heat exchanger 34 is spaced about 10 millimeters apart from the heat exchanger 32).

The mounting plate 94 includes a tab 108 that presses a flange unit 109 attached to the heat exchanger 34 toward the nose 110 of the cooling frame 20 so as to capture and restrain the flange unit 109 therebetween when the heat exchanger 34 is in the use position. The nose 110 is fastened (e.g. bolted) to a plate of the cooling frame 20 and extends forwardly therefrom.

A first isolator 112 covers a tip of the nose 110, and a second isolator 114 covers a tip of the tab 108, each isolator 112, 114 being a single piece of anti-vibration material (e.g., rubber) to prevent metal-to-metal contact. Each isolator 112, 114 includes a U-shaped main body and an interior flange (not shown) attached to an interior surface of one of the legs of the U shape of the main portion, flexibly angled from that leg toward the open end of the U shape so as to resist slippage of the isolator 112, 114 off the nose 110 and tab 108, respectively, and having the same depth as the main portion (i.e., depth of the interior flange is into the page of FIG. 15). For ease of illustration, each isolator 112, 114 is drawn as a simple U without its flange, it being understood that the isolator 112, 114 would have the flange and may bulge somewhat on the side of the flange.

The flange unit 109 includes a flange 116, a bracket 118, and a fastener 120. The flange 116 is generally y-shaped with the top of the "y" welded to the second side or header 56 and the base of the "y" projecting laterally from the heat exchanger 34.

The bracket 118 includes a first hook 122 and a second hook 124, each of which is generally u-shaped. The first hook 122 hooks onto a threaded fitting of fluid conduit 126 coupled fluidly to the heat exchanger 34 to prevent that fitting from rotating (in this case, to prevent it from over-tightening). In the case where the exchanger 34 is a condenser, the fluid conduit 126 is, for example, a refrigerant line extending between a pump (not shown) and the heat exchanger 34 to conduct refrigerant from the pump to the heat exchanger 34. The second hook 124 wraps around the base of the "y" of the flange 116 and is fastened to that base with the fastener 120. The flange unit 109 is thus rigidly mounted to the heat exchanger 34.

In the use position of the heat exchanger 34, the tab 108 presses against the bracket 118. The tab 108 presses against the second hook 124 via the second isolator 114. In turn, the bracket 118 presses against the nose 110. The second hook 124 presses against the nose 110 via the first isolator 112.

Welds and threads have not been shown in the drawings for simplification of illustration, it being understood that they would be well within the skill of one of ordinary skill in the art to provide those features without undue experimentation.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A machine, comprising:
a mount,
a support mounted pivotally to the mount to pivot relative to the mount about a first pivot axis between a. first support position and a second support position, and
a heat exchanger, the heat exchanger having at right angles to one another a first dimension, a second dimension, and a third dimension and having, in a use position of the heat exchanger, a height in the first dimension, a width in the second dimension, and a thickness in the third dimension, the heat exchanger porous therethrough in the third dimension for flow of air through the heat exchanger, the heat exchanger mounted pivotally to the support to pivot relative to the support about a second pivot axis between a first exchanger position and a second exchanger position, the second pivot axis parallel to the second dimension, the first pivot axis non-parallel to the second dimension and positioned higher than the second pivot axis at a point of connection between the support and the mount when the support is positioned in the second support position, the heat exchanger movable relative to the mount between the use position in which the heat exchanger is positioned in the first exchanger position and the support is positioned in the first support position and a clean-out position in which the heat exchanger is positioned in the second exchanger position and the support is positioned in the second support position, the heat exchanger configured to lean about the second pivot axis away from the first exchanger position into a lean position allowing tilting of the heat exchanger about the first pivot axis during a transition between the use position and the clean-out position;
wherein, an obstacle prohibits the heat exchanger from substantially pivoting about the first pivot axis unless the heat exchanger is in the lean position;
wherein the first pivot axis passes through a portion of the heat exchanger in both the use position and the clean-out position.

2. The machine of claim 1, wherein the second pivot axis is horizontal when the support is positioned in the first support position.

3. The machine of claim 1, further comprising a first obstacle included in or distinct from the mount and a second obstacle included in or distinct from the mount, wherein in the use position the heat exchanger is positioned in proximity to the first obstacle and the second obstacle without tilting over the second obstacle, and in the clean-out position the heat exchanger is angled about the second pivot axis relative to the first obstacle and is tilted about the first pivot axis over the second obstacle, and the heat exchanger is configured to lean about the second pivot axis away from the first obstacle providing a clearance between the heat exchanger and the first obstacle allowing tilting of the heat exchanger about the first pivot axis during, the transition between the use position and the clean-out position.

4. The machine of claim 3, wherein the heat exchanger is a first heat exchanger, the first obstacle is configured as a second heat exchanger, and the first and second heat exchangers are stacked in flow-series relation to one another when the first heat exchanger is positioned in the use position.

5. The machine of claim 1, wherein the mount comprises a stand, and the support is mounted pivotally to the stand so as to depend relative thereto when the support is positioned in the first support position.

6. The machine of claim 5, wherein the stand comprises a lower portion and an upper portion, the lower portion is mounted to the mount, the support comprises a U-shaped bracket to which two sides of the heat exchanger opposite to one another are mounted pivotally and an arm mounted pivotally to the upper portion and to which the U-shaped bracket is mounted.

7. The machine of claim 6, wherein the U-shaped bracket comprises a first ear, a second ear, and a bar interconnecting the first and second ears, the two sides of the heat exchanger comprise a first side mounted pivotally to the first ear and a second side mounted pivotally to the second ear, and the bar is mounted to the arm and extends along and under the heat exchanger when the heat exchanger is positioned in the use position.

8. The machine of claim 5, wherein the support comprises an arm mounted pivotally to the stand and depending relative to the stand when the support is positioned in the first support position.

9. The machine of claim 8, wherein the arm is inclined.

10. The machine of claim 9, wherein the stand comprises a lower portion and an upper portion to which the arm is mounted pivotally, and the upper portion is inclined.

11. The machine of claim 5, wherein the stand comprises a lower portion and an upper portion to which the support is mounted pivotally, and the upper portion is inclined.

12. The machine of claim 5, wherein the support comprises a striker, the stand comprises a first travel limiter and a second travel limiter, the first travel limiter is configured to contact the striker to limit pivoting of the support about the first pivot axis beyond the first support position, and the striker is configured to contact the second travel limiter when the support is positioned in the second support position.

13. The machine of claim 1, wherein the support comprises a U-shaped bracket to which two sides of the heat exchanger opposite to one another are mounted pivotally and an inclined arm mounted pivotally to the mount and to which the U-shaped bracket is mounted.

14. The machine of claim 13, wherein the U-shaped bracket comprises a first ear, a second ear, and a bar interconnecting the first and second ears, the two sides of the heat exchanger comprise a first side mounted pivotally to the first ear and a second side mounted pivotally to the second ear, and the bar is mounted to the arm and extends along and under the heat exchanger when the heat exchanger is positioned in the use position.

15. The machine of claim 14, wherein the U-shaped bracket comprises a travel limiter mounted to and angled from the first ear, and the beat exchanger is configured to contact the travel limiter when the heat exchanger is positioned in the second exchanger position.

16. The machine of claim 13, wherein the arm is inclined.

17. A machine, comprising:
a mount,
a support mounted pivotally to the mount to pivot relative to the mount about a first pivot axis between a first support position and a second support position, and
a heat exchanger, the heat exchanger having at right angles to one another a first dimension, a second dimension, and a third dimension and having, in a use position of the heat exchanger, a height in the first dimension, a width in the second dimension, and a thickness in the third dimension, the heat exchanger porous therethrough in the third dimension for flow of air through the heat exchanger, the heat exchanger mounted pivotally to the support to pivot relative to the support about a second pivot axis between a first exchanger position and a second exchanger position, the second pivot axis parallel to the second dimension, the first pivot axis non-parallel to the second dimension and positioned higher than the second pivot axis at a point of connection between the support and the mount when the support is positioned in the second support position, the heat exchanger movable relative to the mount between the use position in which the heat exchanger is positioned in the first exchanger position and the support is positioned in the first support position and a clean-out position in which the heat exchanger is positioned in the second exchanger position and the support is positioned in the second support position, the heat exchanger configured to lean about the second pivot axis away from the first exchanger position into a lean position allowing tilting of the heat exchanger about the first pivot axis during a transition between the use position and the clean-out position;
wherein, an obstacle prohibits the heat exchanger from substantially pivoting about the first pivot axis unless the heat exchanger is in the lean position;
wherein, the second pivot axis is horizontal when the support is positioned in the first support position, and the first pivot axis passes through a portion of the heat exchanger in both the use position and the clean-out position.

18. The machine of claim 17, wherein the mount comprises a stand, and the support is mounted pivotally to the stand so as to depend relative thereto when the support is positioned in the first support position.

19. A machine, comprising:
a mount,
a support mounted pivotally to the mount to pivot relative to the mount about a first pivot axis between a first support position and a second support position, and
a heat exchanger, the heat exchanger having at right angles to one another a first dimension, a second dimension, and a third dimension and having, in a use position of the heat exchanger, a height in the first dimension, a width in the second dimension, and a thickness in the third dimension, the heat exchanger porous therethrough in the third dimension for flow of air through the heat exchanger, the heat exchanger mounted pivotally to the support to pivot relative to the support about a second pivot axis between a first exchanger position and a second exchanger position, the second pivot axis parallel to the second dimension, the first pivot axis non-parallel to the second dimension and positioned higher than the second pivot axis at a point of connection between the support and the mount when the support is positioned in the second support position, the heat exchanger movable relative to the mount between the use position in which the heat exchanger is positioned in the first exchanger position and the support is positioned in the first support position and a clean-out position in which the heat exchanger is positioned in the second exchanger position and the support is positioned in the second support position, the heat exchanger configured to lean about the second pivot axis away from the first exchanger position into a lean position allowing tilting of the heat exchanger about the first pivot axis during a transition between the use position and the clean-out position;
wherein, an obstacle prohibits the heat exchanger from substantially pivoting about the first pivot axis unless the heat exchanger is in the lean position;
wherein the mount comprises a stand, and the support is mounted pivotally to the stand so as to depend relative thereto when the support is positioned in the first support position;
further wherein, the support comprises a striker, the stand comprises a first travel limiter and a second travel limiter, the first travel limiter is configured to contact the striker to limit pivoting of the support about the first pivot axis beyond the first support position, and the striker is configured to contact the second travel limiter when the support is positioned in the second support position.

* * * * *